United States Patent [19]
Austin et al.
[11] Patent Number: 4,638,316
[45] Date of Patent: Jan. 20, 1987

[54] RADAR REFLECTING ELECTROLYTES

[75] Inventors: Theodore D. Austin, Landover; John P. Consaga, Clinton, both of Md.

[73] Assignee: The United States of America as represented by the Secretary of the Navy, Washington, D.C.

[21] Appl. No.: 408,973

[22] Filed: Oct. 30, 1973

[51] Int. Cl.[4] .......... G01S 7/38
[52] U.S. Cl. .......... 342/14; 342/12
[58] Field of Search .......... 343/18 B, 18 E

[56] References Cited

U.S. PATENT DOCUMENTS

| | | | |
|---|---|---|---|
| 2,871,344 | 1/1959 | Busignies | 343/18 B |
| 3,150,848 | 9/1964 | Lager | 343/18 E X |
| 3,189,901 | 6/1965 | Cutolo | 343/18 B X |
| 3,518,670 | 6/1970 | Miller | 343/18 E |
| 3,761,929 | 9/1973 | Wyatt | 343/18 E X |
| 3,808,595 | 4/1974 | Coop et al. | 343/18 E |
| 4,030,098 | 6/1977 | Nahmias | 343/18 E X |
| 4,175,469 | 11/1979 | Ritland et al. | 343/18 E X |
| 4,406,815 | 9/1983 | Magnusson et al. | 343/18 E X |

*Primary Examiner*—T. H. Tubbesing
*Attorney, Agent, or Firm*—Kenneth E. Walden; Thomas E. McDonnell

[57] ABSTRACT

Method of reflecting electromagnetic energy and jamming radar by imposing a solution of an organic electrolyte with a dielectric constant of at least 90 at 25° C. in the path of the electromagnetic energy.

8 Claims, No Drawings

RADAR REFLECTING ELECTROLYTES

BACKGROUND OF THE INVENTION

This invention relates generally to reflection of electromagnetic energy and in particular to a radar countermeasure utilizing electromagnetic energy reflection to confuse radar reception.

Modern air defense systems employ radar extensively for the detection and location of hostile aircraft. Radar is a system for detecting and locating targets by radiating electromagnetic energy and then receiving the electromagnetic energy reflected from the targets. In order to minimize the effectiveness of radar, attacking aircraft often disperse various materials which reflect electromagnetic energy and thereby confuse radar reception. A type of radar reflecting material which is often dispensed from airplanes for this purpose is commonly known as chaff or rope. The first material to be used as radar chaff is strands of metal foil, e.g. aluminum. Since these metallic strips act as dipoles which reflect the electromagnetic energy, their effectiveness requires that their length closely equal one half the wave length of the opposing radar. Several serious disadvantages are inherent with this requirement. The wave frequency bands at which radar is radiated are 8–18 and 26.5–40 GHz and hence the strand must be more than two inches long. Strands longer than two inches bend easily and tend to ball up or coil during free fall, thereby decreasing the effective radar reflection. Also by twisting up into a ball, the metal coils fall more quickly to the ground. In efforts to overcome this defect, great care and expense have been expended in packaging, transporting, and dispensing the strands of metal foil in order to prevent coiling and bending. The amount of success has been minimal because of the shock occurring at ejection into the air. Another problem arising from the strand's dependence on length is that several lengths must be dispensed although only one length is needed.

Another material often used for chaff is glass or plastic fibers coated with a relective material and formed into strands. The effectiveness of this type of chaff also depends on length and so its disadvantages are similar to strands of metal foil. While these reflective strands of plastic or glass do not bend or coil and are easier to pack and dispense, they do break during packing and especially upon impact with the air when they are dispersed.

Artificial ion clouds have also been used to reflect electromagnetic energy. The earlier techniques relied on explosions or thermal reactions to create the ion cloud. Although the use of ion clouds represented a significant advancement in the art of radar countermeasures, a number of problems still existed. Ionization was short lived because of diffusion, recombination, and attachment. Another disadvantage was the low percentage conversion of material into ions, which meant that the cost of an effective ion cloud was high.

Another method of producing an artificial ion cloud is to disperse particles of chemicals e.g. lithium hydride which photo-ionize. However the effectiveness of these chemicals is greatly affected by the humidity of the air. Also chemicals like lithium hydride are dangerous to handle, difficult to store, and are expensive.

SUMMARY OF THE INVENTION

Although the problems and requirements of producing a suspension in the air which reflects electromagnetic energy are well known, present techniques, as has been noted, are not entirely satisfactory.

Accordingly, one object of this invention is to provide an improved electromagnetic energy reflector for use as a radar countermeasure.

Another object of this invention is to provide an electromagnetic energy reflector whose effectiveness does not depend on its physical shape or size.

Another object of this invention is to provide an electromagnetic energy reflector which may be simply and inexpensively produced.

Another object is to provide an electromagnetic energy reflecting suspension which has a longer life time than present reflecting suspensions.

Yet another object of this invention is to provide an electromagnetic energy reflector capable of storage for a long time and in a small place.

A further object is to provide an electromagnetic energy reflector which can be made from non strategic materials.

A still further object is to provide an electromagnetic energy reflector which can not be damaged by the shock created by the ejection from an aircraft traveling at a high speed.

Also an object of this invention is to provide an electromagnetic energy reflector which has a high degree of independence from weather conditions.

These and other objects of this invention are accomplished by the use of solution with a dielectric constant of at least 90 at 25° C. of electrolytes having ionic charges along the polymer backbone dissolved in a polar solvent.

DESCRIPTION OF THE PREFERRED EMBODIMENTS

An electrolyte is any substance that dissociates into ions when dissolved in a suitable medium. The organic electrolytes of this invention reflect electromagnetic energy by the individual molecules acting as dipoles. Upon solvation in a polar solvent an organic electrolyte encompassed by the present invention ionizes. Intermolecular repulsion causes the ionic constitutents to arrange themselves as far apart as possible and thereby cause the molecule to become a dipole.

Whether a solution of an organic electrolyte previously mentioned contains molecular dipoles in sufficient number and strength can be readily determined by measuring the dielectric constant of the solution by any of the methods commonly used in the art. The relationship between the dielectric constant and the reflectivity of the solution can be best understood from a discussion of the following equations.

The amount of reflection is expressed as the reflection coefficient which is defined as the ratio of the reflected wave to the incident wave. The reflection coefficient for perpendicular incidence of electromagnetic radiation on a surface is given by $$r = \frac{Z_2 - Z_1}{Z_2 + Z_1}$$

where Z is called the impedence of matter, the subscript numeral 1 refers to the medium through which the radiation is moving, and the subscript numeral 2 refers to the matter on which the radiation impinges.

The impedance Z is related to the dielectric constant of matter by the equation $$Z = \sqrt{\frac{\mu}{\epsilon}}$$

where $\mu$ is the magnetic permeability of matter and $\epsilon$ is the electric permitivety or dielectric constant. Thus the equation for the reflective coefficient becomes $$r = \frac{\sqrt{\frac{\mu_2}{\epsilon_2}} - \sqrt{\frac{\mu_1}{\epsilon_1}}}{\sqrt{\frac{\mu_2}{\epsilon_2}} + \sqrt{\frac{\mu_1}{\epsilon_1}}}$$

In the present case $\mu_1$ and $\mu_2$ have been found to approximately equal, so the equation for the reflective coefficient simiplifies to $$r = \frac{\sqrt{\frac{1}{\epsilon_2}} - \sqrt{\frac{1}{\epsilon_1}}}{\sqrt{\frac{1}{\epsilon_2}} + \sqrt{\frac{1}{\epsilon_1}}}$$

Since the dielectric constant for air is known, the reflective coefficient depends only on the dielectric constant of the medium causing reflection.

The dielectric constant is related to the composition of the solution primarily by the density and polarization of the solution. This relationship is given by $$\epsilon = \frac{1 + 2d/MP(w)}{1 - 2d/MP(w)}$$

where d is the density of the solution, M is the mean molecular weight of the solution, and P(w) is the mean molar polarization of the solution. To further elaborate the mean molecular weight is calculated from the formula $M = \Sigma M_j f_j$ where $M_j$ is the molecular weight of the j th ingredient of the solution and $f_j$ is the mole fraction of that ingredient. Likewise P(w) is given by the formula $P(w) = \Sigma P(w)_j f_j$ where $P(w)_j$ is the molar polarization of the j th ingredient. The dependence of P(w) on the structure of the molecules is shown by the equation $$P(w)j = \frac{4\pi N}{3}\left[ \alpha_o + \left(\frac{\mu^2}{3KT}\right)\left(\frac{1}{1 + 1w\tau}\right)\right]$$

where N is Avogadro's number, $\alpha_o$ is the polarizability of the molecule, $\mu$ is the electric dipole moment of the molecule, K is the Boltzman constant, T is the absolute temperature, w is the frequency of the incident radiation and $\tau$ is the relaxation time of the molecule.

The polar solvent to be used in the practice of the invention may be water, dioxane, and the like with water being the most preferred. The solvent should have a vapor pressure no higher than water.

The organic electrolytes of this invention which were found to produce solutions having a dielectric constant greater than 90 at 25° C. can be classed in three general groups:

1. monomers and polymers containing a sulfonium ion which may be represented by the general formula

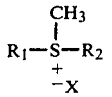

2. monomers and polymers containing a quaternary ammonium ion which may be represented by the general formula

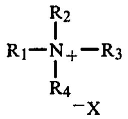

3. monomers and polymers containing both sulfonium and quaternary ammonium ions.

In the above formulas X is an anion and $R_1$, $R_2$, $R_3$ and $R_4$ may be any organic adduct so long as the resulting molecule when dissolved in a polar solvent gives a solution with a dielectric constant greater than 90 at 25° C. Examples of the first group would be methylated polyethylene sulfide, methylated polypropylene sulfide, methylated polyphenylene sulfide, methylated polydivivyl sulfide, methylated polythiodiethanol urethanes and methylated 2 mercaptoethylene sulfide. Electrolytes like methylated polyethyleneimine, quarternary amine salts of 2-vinyl polybutadiene, and quaternary amine salts of polyepichlorohydrin would be examples of the second group and methylated aminoethyl sulfide would be a good example of the third group.

The organic electrolytes of this invention may be prepared by a number of art recognized methods. They may be prepared by methylating amines and sulfides by means of methylating agent, e.g. dimethyl sulfate, methyl iodide, or methyl fluorosulfonate in an organic solvent, e.g. toluene. An example of this method would be the preparation of methyl sulfonium diethylthioether

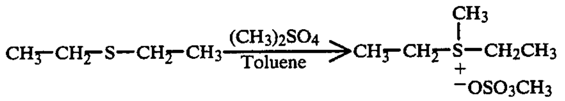

An excellent method for preparing quartenary amine salts suitable for use in this invention is illustrated by the simple adduct reaction of epichlorohydrin with trialkylamine.

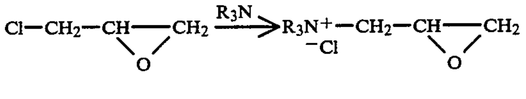

Sulfides may be used instead of amines as is illustrated by the adduct reaction of chloromethylbutadiene with a dialkyl sulfide.

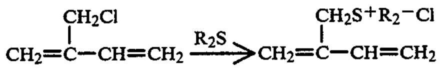

If the starting material is not halogenated, the materials can be easily halogenated with a hydrogen halide in presence of hydrogen peroxide as is shown by the preparation of quaternary amine bromide of a high vinyl polybutadiene.

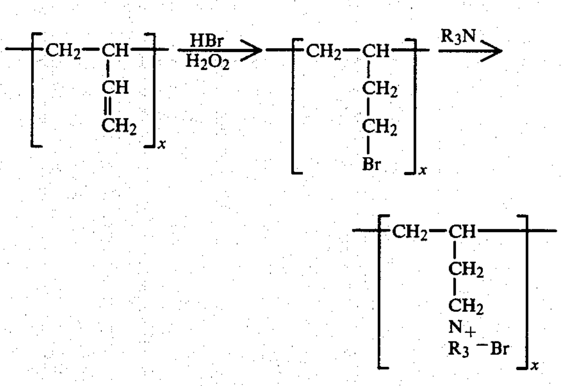

All of the preparation methods mentioned for the organic electrolyte do not require any special reaction conditions or techniques. The solutions of the organic electrolytes which are to be dispersed are simply prepared by dissolving an organic electrolyte in water or another polar solvent. The dielectric constant of the resulting solution is then checked by any known methods. If the value is below ninety, more of the organic electrolyte is added. Generally most aqueous solutions of the organic electrolyte will obtain their maximum dielectric constant at a concentration between 30 and 50 weight percent of the solute.

The testing method used to determine whether a particular solution would effectively "jam" hostile radar, i.e. give a false signal to the radar receiver was to compare the amount of reflection of electromagnetic energy at frequencies of 10 GHz and 30 GHz of a film one millimeter thick of a test solution with that of an aluminum plate. The apparatus used to test the samples comprised a simple wave guide with a right angle bend having two directional couplers attached to the longer portion and having the end of the shorter portion flared out. Attached to each of the directional couplers was a detector and an amplifier and both were then attached to ratiometer. Testing a sample comprised placing a sample holder with a one millimeter thick film of a test solution on the vertical shorter portion of the wave guide and beaming electromagnetic energy at one of the test frequencies through the opening at the horizontal longer portion. The first directional coupler would sample the generated wave and the second directional coupler would sample the reflected wave. The amount of reflection would be determined by the ratiometer. The reflectivity of the aluminum plate was tested by simply placing the plate on top of the flared end. It should be noted aluminum chaff would not give as much reflection as the aluminum plate which was used as the test standard.

The same apparatus was used to test whether a mist of a test solution would give the same results as a film of the test solution. An ordinary laboratory atomizer was used to spray a mist of methylated polyethylene sulfide over the flared end. A comparison of the mist test results were nearly identical with the film test results of methylated polyethylene sulfide.

Any solution which did not reflect at least 65% of the amount of electromagnetic energy reflected aluminum was deemed not to be effective for "jamming" radar. It was determined that a solution of an organic electrolyte with a dielectric constant of at least 90 would reflect at least this amount of electromagnetic.

The following are representative examples of aqueous solutions at concentrations between 30 and 50 weight percent of solute which gave a reflection of at least 65% of the aluminum plate. These examples should not be considered as limiting the invention.

TABLE

| Example | Solute | Dielectric constant | % reflection |
|---|---|---|---|
| 1 | methylated polyethylene sulfide (mol. wt. ≈ 50,000) | 90+ | 80 |
| 2 | methylated polyethyleneimine (mol. wt. ≈ 50,000) | 90+ | 65-75 |
| 3 | methylated polyphenylene sulfide (mol. wt. ≈ 12,000) | 90+ | 65-75 |
| 4 | methylated aminoethylsulfide | 90+ | 65-75 |
| 5 | methylated thiodiethanol | 90+ | 65-75 |
| 6 | Methylated 2-mercaptoethyl sulfide | 90+ | 65-75 |
| 7 | quaternary amine bromide of vinyl polybutadiene (mol. wt. ≈ 50,000) | 90+ | 65-75 |
| 8 | quaternary amine chloride of polyepichlorohydrin (mol. wt. ≈ 50,000) | 90+ | 65-75 |

Methylated polethylene sulfide is the preferred organic electrolyte because of it overall high reflectivity, commercial availability, low cost, and safety. The other electrolytes have these same advantages, but methylated polyethylene sulfide possesses them to the greatest degree overall. A solution of this electrolyte like the other electrolytes of this invention sprayed from an airplane by any means gives a suspension with a reflectivity of the same magnitude as aluminum chaff but with greater persistence and with none of the handling and dispersing problems associated with chaff.

Obviously many modifications and variations of the present invention are possible in the light of the above teachings. It is therefore to be understood that within the scope of the appealed claims the invention may be practiced otherwise than as specifically described.

What is claimed as new and secured by Letters Patent of the United States is:

1. A method for reflecting electromagnetic energy which comprises the step of imposing in the path of the electromagnetic energy a solution of a solvent and an organic electrolyte, said solution having a dielectric constant of at least ninety at 25° C.

2. The method of claim 1 wherein the step of imposing comprises imposing in the path of the electromagnetic energy a solution of a solvent selected from the group consisting of water and dioxane, and a organic electrolyte.

3. The method of claim 1 wherein the step of imposing comprises imposing in the path of the electromagnetic energy a solution of water and an organic electrolyte, said water comprising 50 to 70 weight percent of the solution.

4. The method of claim 1 wherein the step of imposing comprises imposing in the path of the electromagnetic energy a solution of a solvent and an organic electrolyte selected from the group consisting of monomers and polymers containing a sulfonium ion, monomers and polymers containing a quaternary ammonium ion, and monomers and polymers containing a sulfonium ion and a quaternary ammonium ion, and mixtures thereof provided that the resulting solution has a dielectric constant of at least 90.

5. The method of claim 1 wherein the step of imposing comprises imposing in the path of the electromagnetic energy a solution of a solvent and an organic electrolyte selected from the group consisting of monomers and polymers containing a sulfonium ion selected from the group consisting of methylated polyethylene sulfide, methylated polypropylene sulfide, methylated polyphenylene sulfide, methylated polydivinyl sulfide, methylated polythiodiethanol urethanes, 3 chloropropylene sulfide, 2-mercaptoethylene sulfide and mixtures thereof, monomers and polymers containing a quaternary ammonium ion, and monomers and polymers containing a sulfonium ion and a quaternary ammonium ion, and mixtures thereof provided that the resulting solution has a dielectric constant of at least 90.

6. The method of claim 1 wherein the step of imposing comprises imposing in the path of the electromagnetic energy a solution of a solvent and an organic electrolyte selected from the group consisting of monomers and polymers containing a sulfonium ion, monomers and polymers containing a quaternary ammonium ion, selected from the group consisting of methylated polyethyleneimine, quaternary amine salts of vinyl polybutadiene, quaternary amine salts of polyepichlorohydrin, and mixtures thereof, and monomers and polymers containing a sulfonium ion and a quaternary ammonium ion, and mixtures thereof provided that the resulting solution has a dielectric constant of at least 90.

7. The method of claim 1 wherein the step of imposing comprises imposing in the path of the electromagnetic energy a solution of a solvent and an organic electrolyte selected from the group consisting of monomers and polymers containing a sulfonium ion, monomers and polymers containing a quaternary ammonium ion, methylated aminoethyl sulfide, and polymers containing a sulfonium ion and a quaternary ammonium ion, and mixtures thereof provided that the resulting solution has a dielectric constant of at least 90.

8. The method of claim 1 wherein the step of imposing comprises imposing in the path of the electromagnetic energy a solution comprising 70 weight percent of water and 30 weight percent of methylated polyethylene sulfide.

* * * * *